Dec. 5, 1961   J. C. BRANDON, JR., ET AL   3,011,213
APPARATUS FOR LUBRICATING MOLD CAVITIES
Filed Feb. 19, 1958   3 Sheets-Sheet 1
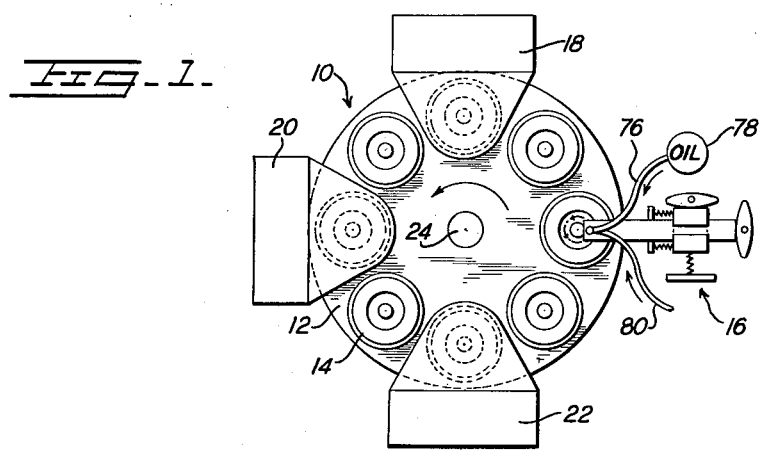
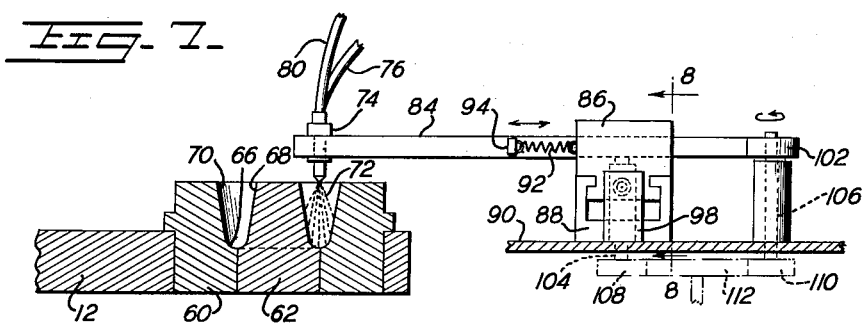
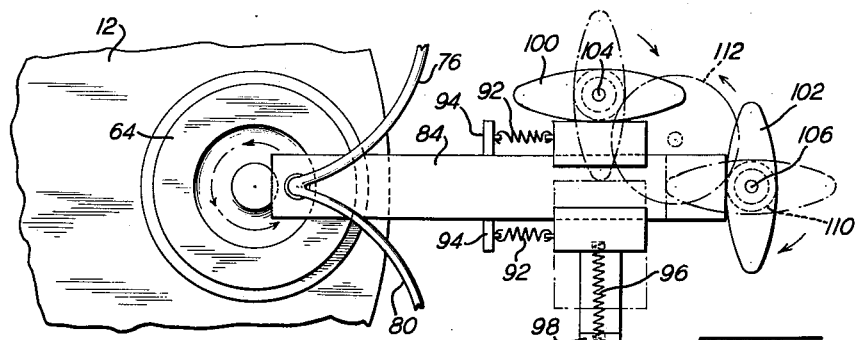
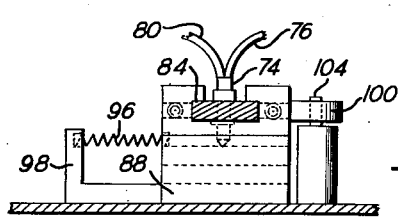
INVENTORS.
J. CAMPBELL BRANDON, JR.
HARRY EYBERGER
BY
Shanley & O'Neil
ATTORNEY

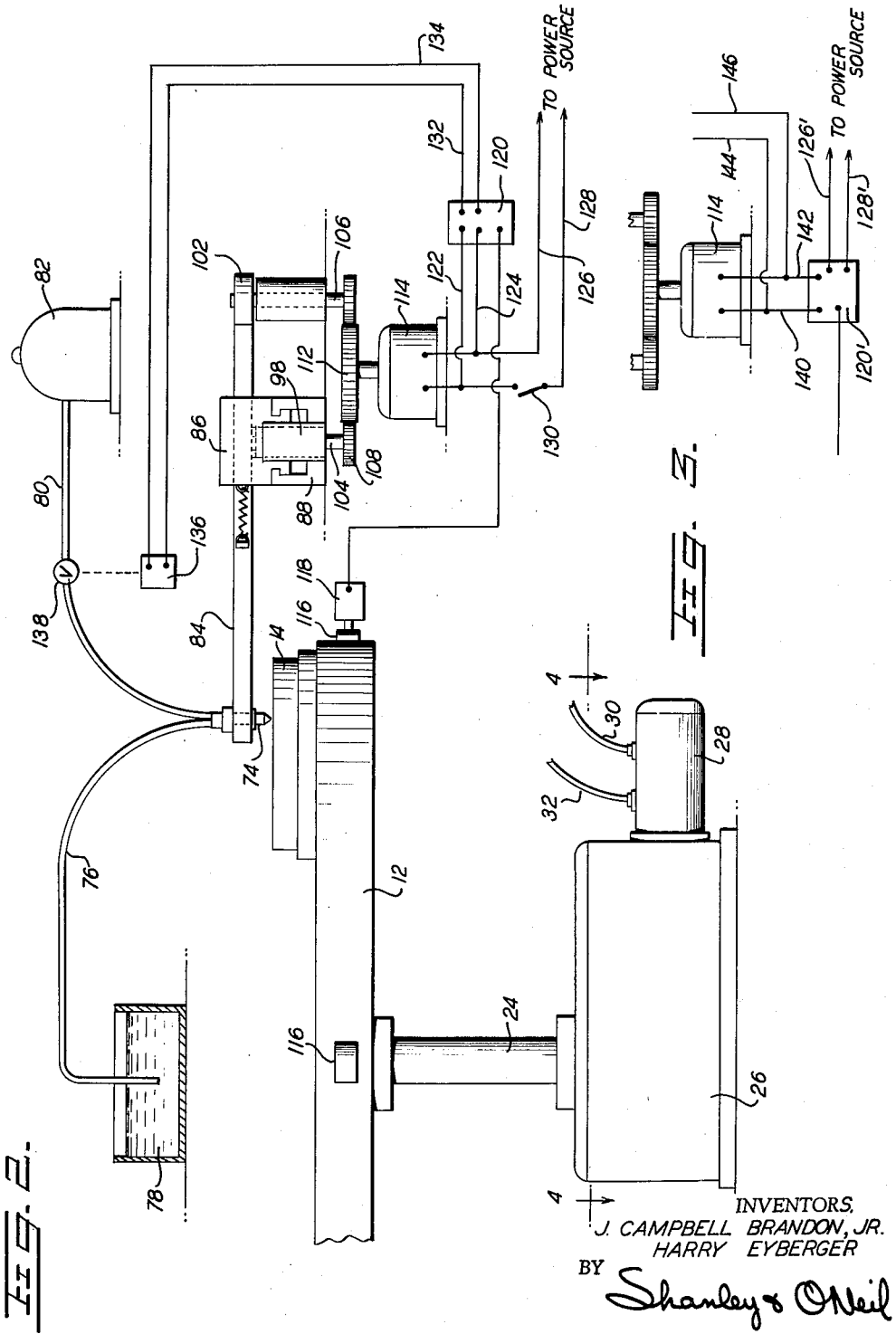

Dec. 5, 1961  J. C. BRANDON, JR., ET AL  3,011,213
APPARATUS FOR LUBRICATING MOLD CAVITIES
Filed Feb. 19, 1958  3 Sheets-Sheet 3

INVENTORS.
J. CAMPBELL BRANDON, JR.
HARRY EYBERGER
BY Shanley & O'Neil
ATTORNEY

United States Patent Office 3,011,213
Patented Dec. 5, 1961

3,011,213
APPARATUS FOR LUBRICATING
MOLD CAVITIES
James Campbell Brandon, Jr., and Harry Eyberger, Butler, Pa., assignors to Magnetics, Inc., a corporation of Pennsylvania
Filed Feb. 19, 1958, Ser. No. 716,083
4 Claims. (Cl. 18—20)

The present invention relates to lubricating molds, and more particularly to lubricating molds having upwardly open mold cavities defined by a bottom wall and a continuous inner side wall and a continuous outer side wall spaced from and encompassing the inner side wall, for the purpose of reducing adhesion between the molded body and the surfaces defining the mold cavity. The invention has utility in a wide variety of molding operations and has particular utility in relatively high speed automatic molding operations for the quantity production of relatively small molded bodies. For purposes of describing particular embodiments, the invention will be disclosed by way of example in connection with the high speed automatic molding of insulated particles of magnetic material so as to form small magnetic cores of the types used in automation systems, electronic computers, magnetic controls and amplifiers, and the like.

The formation of certain bodies of compressed metallic particles, such as the formation of toroidal magnetic cores of compressed insulated particles of magnetic material, requires the application of extremely high pressures, such as 200,000 to 250,000 pounds per square inch. For this operation, a molding die is employed presenting a pressure or molding cavity of toroidal shape, for example, into which a measured quantity of powdered material, such as insulated particles of magnetic material, is deposited. A pressure ring is placed in the cavity over the charge of powdered material and the required pressure is applied through the pressure ring to form the powdered material into an integral body of a shape theoretically determined by the configuration of the pressure cavity. In view of the high pressures required, it has been necessary in the past to employ a molding die made up of a plurality of separable arcuate die sections in order to permit withdrawal of the formed body from the pressure cavity. These sections form a sectional ring about a center plug with a pressure cavity therebetween, the outer and inner contours of the pressure cavity being defined by the confronting surfaces of the die sections and the center plug, respectively.

More recently, molding methods and devices have been developed, in which molded bodies of this configuration are formed from powdered materials by substantially uniformly subjecting powdered material in a mold cavity of corresponding shape to relatively high pressure, the cavity including an outside continuous or closed surface formed on a body member comprising a single piece of material and an inside continuous or closed surface formed on a center plug or member relatively movable with respect to the body member. The inside and outside continuous surfaces are formed in predetermined relative relationship to permit withdrawal of a formed core from the pressure cavity upon relative movement between the body member and the center plug along the longitudinal axis of the formed core. An example of the more recent methods and devices is disclosed in application Serial No. 659,925, filed May 17, 1957 by Harry Eyberger, one of the present applicants.

The use of high molding pressures causes the mold powder to bond or weld to the walls of the mold cavity. When it is attempted to remove the molded body from the cavity, the bond between the walls and the molded body causes the latter to fracture in shear. Therefore it has become necessary to lubricate the walls of the mold cavity so as to prevent adherence of the molded body thereto and facilitate its removal.

In view of the configuration of the mold cavities in question, lubrication has had to be performed by hand, by brushing or wiping a lubricant on those portions of the mold surfaces which would later contact the formed core. Adequate lubrication was obtained in this way, but the procedure was extremely time consuming and not at all adapted for high speed operations. Obviously, the advantages of high-speed high-production molding machines are largely lost when they are operated at only a fraction of their designed speeds so as to allow sufficient time for hand lubrication of the molds.

Although many attempts were made to overcome the difficulties and disadvantages of hand oiling, none, as far as is known, was successfully practiced commercially on an industrial production scale.

The applicants have tried using an annular spray but found that non-uniform oiling of the mold cavity resulted. It was theorized that the air in the mold cavity could not escape during the time the spray was directed toward the cavity and as a result the oil droplets were unable to enter the cavity in a uniform pattern.

The present invention solves the above problems of the prior art by providing methods and apparatus for rapidly and automatically lubricating the interior surfaces of the molds having upwardly open mold cavities defined by a bottom wall and a continuous inner side wall and a continuous outer side wall spaced from and encompassing the inner side wall, such as an upwardly open annular mold cavity. According to the broad method and its corresponding apparatus, a stream of lubricant in the form of a spray is directed against at least a portion of the mold surfaces defining the cavity and the spray is moved in contact with at least a portion of those surfaces about at least a major portion of a closed path which is substantially congruent with the mold cavity. If the mold cavity is annular, the closed path is circular and substantially concentric with the annular cavity. In this latter case, it is preferred that the axis of the spray be parallel to the axis and intersect the mean circumference of the annular mold cavity.

The present invention also provides high speed automatically oiled molding devices comprising a plurality of interconnected identical molds each having an upwardly open mold cavity as described above, the distance between all immediately adjacent mold cavities being constant. The interconnected molds are moved through a cycle of movement consisting of alternate periods of rest and periods of movement through a distance evenly divisible by the distance between molds and in a direction such that each mold cavity occupies during each rest period a position occupied by another mold cavity during a previous rest period. In an illustrative embodiment, such as that disclosed in the copending application referred to above, the molding device is rotary and has a rotatable mold turret in which the mold cavities are spaced constant arcuate distances apart and a common distance from the axis of rotation, the turret periodically rotating an arcuate distance evenly divisible by the arcuate distance between molds. In any form of turret, however, the lubricating devices described above are provided and are so actuated as to move the spray about a major portion of its closed path during each rest period, the spray being discontinued during movement of the molds.

Accordingly, it is an object of the present invention to provide methods and apparatus for lubricating mold cavities, which will be rapid in operation.

Another object of the invention is the provision of methods and apparatus for lubricating mold cavities having interior portions masked from other interior portions, which will thoroughly and uniformly lubricate the walls of the mold cavities.

Another object of the invention is the provision of molding devices provided with a plurality of movable molds, in combination with lubricating means operable to lubricate the molds in serial fashion.

A further object of the invention is the provision of combined multiple-mold molding devices and lubricating means therefore, operable intermittently in alternation with each other.

Still another object of the invention is the provision of combined molding devices and lubricating means for the molds thereof, in which the molds are movable in alternation with the operation of the lubricating means.

Finally, it is an object of the present invention to provide mold lubricating devices which will be simple in structure, inexpensive to manufacture, rapid and economical in operation, easy to install, maintain and repair, and rugged and durable in use.

Other objects and advantages of the present invention will become apparent from a consideration of the following description, taken in conjunction with the accompanying drawings, in which:

FIGURE 1 is a somewhat schematic plan view of a molding device according to the present invention;

FIGURE 2 is a schematic elevational view of a combined molding and mold lubricating device according to the present invention;

FIGURE 3 is a fragment of FIGURE 2 but showing a modified form of lubrication control;

FIGURE 7 is an enlarged elevational fragment of the structure of FIGURE 1;

FIGURE 8 is a fragmentary section on the line 8—8 of FIGURE 7;

FIGURE 9 is an enlarged fragment of FIGURE 1 showing particularly the operation of the lubricating means.

*General arrangement*

Figure 4:
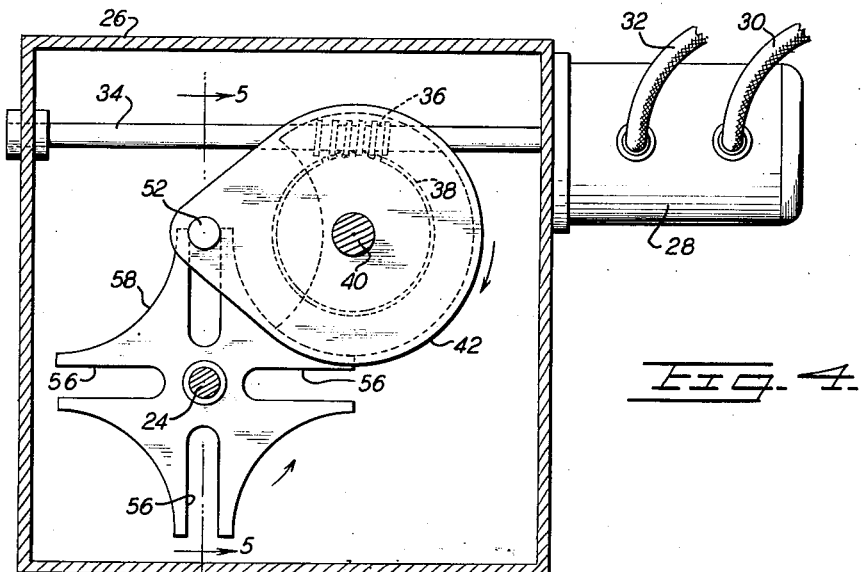
FIGURE 4 is a section on the line 4—4 of FIGURE 2.

In FIGURE 1, the over-all arrangement and operation of the present invention is shown. Broadly a rotary molding device indicated generally at 10 comprises a rotary turret 12 rotatable in its plane about a vertical axis. A plurality of molds 14 are spaced apart equal arcuate distances about the radially outer portions of turret 12 and are all spaced equal distances from the axis of rotation of turret 12.

A mold lubricating device indicated generally at 16 is adjacent turret 12 and extends inwardly radially of turret 12 over the outer peripheral edge thereof. Lubricating device 16 is operative to lubricate each mold 14 or any selected series of molds 14 in serial fashion.

The molds prepared for filling by lubrication at device 16 are then passed to a mold filling station 18 at which conventional dispensing mechanisms fill the mold with molding powder or other particulate molding substance, which may for example be magnetic particles coated with insulation of the type described in the above identified copending application. The mold then passes on to a pressing station 20 at which a ram compresses the mold powder with heat as described in the copending application to form the molded article. Finally, the mold passes to the ejecting station 22 at which the molded article is removed from the mold as by the mechanism disclosed in the above identified copending application. The combination of filling, pressing and ejecting stations in connection with rotary molding devices is well known and need not be illustrated in greater detail as it forms no part of the present invention.

The rotary motion of turret 12 is intermittent and comprises alternate periods of rest and periods of arcuate movement through equal arcuate distances evenly divisible by the constant center-to-center distance between immediately adjacent molds 14. It is during the rest periods that the operations of lubricating, filling, pressing and ejecting are performed.

*Intermittent turret drive*

Figure 5:
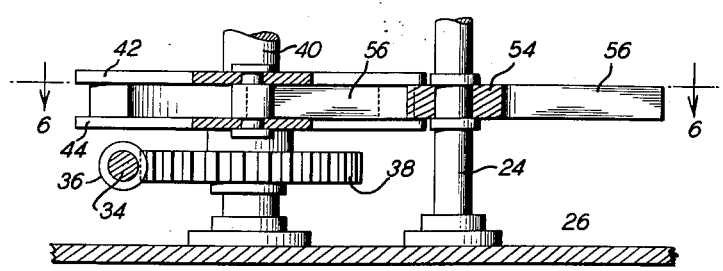
FIGURE 5 is a fragmentary section on the line 5—5 of FIGURE 4.
Figure 6:
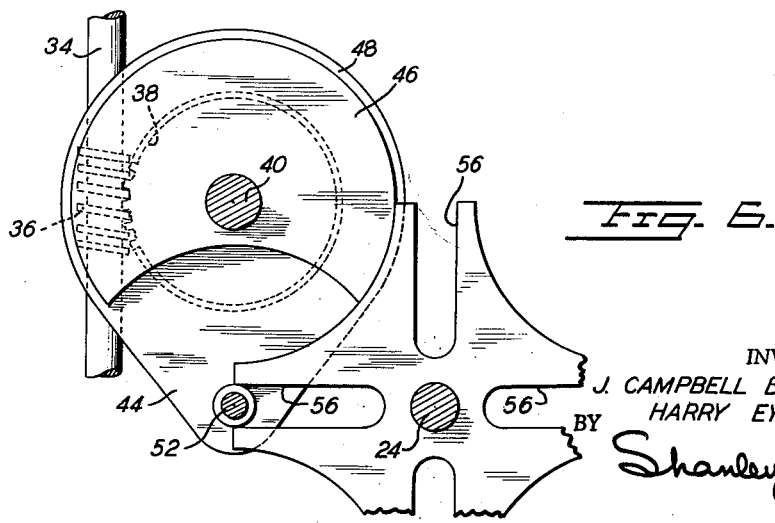
FIGURE 6 is a fragmentary section on the line 6—6 of FIGURE 5.

Turret 12 is supported for intermittent rotary motion on and is driven by a vertical shaft 24 which is journaled for rotation in and extends vertically through a casing 26. As best seen in FIGURES 4, 5 and 6, a conventional fluid motor 28 is mounted on casing 26 and has inlet and outlet conduits 30 and 32, respectively, by which it is connected to a source of driving fluid pressure (not shown). A horizontal drive shaft 34 is journaled for rotation in the side walls of casing 26 and carries a worm or pinion 36 fixedly mounted thereon. Shaft 34, and hence pinion 36, is continuously drivingly rotated by fluid motor 28 in a conventional manner. Pinion 36 is in driving mesh with a worm wheel or spur gear 38 spline coupled to a vertical shaft 40 which is journaled at its ends in the upper and lower walls of casing 26.

Fixedly mounted on shaft 40 is a pair of horizontal parallel drive plates 42 and 44 which are spaced apart by a locking plate 46 also fixedly mounted to shaft 40. Plate 46 has a circularly convex peripheral edge 48 which is interrupted by an arcuately concave recess 50 extending over a little more than 90° of the arc of edge 48.

At their radially outer extremities drive plates 42 and 44 carry between them a roller drive pin 52 adapted to coact with a conventional Geneva gear 54 intermittently to drive shaft 24. Gear 54 is provided with four radially extending slots 56 which are spaced apart by four circularly concave recesses 58 the radii of curvature of which are equal to each other and approximately equal to the radius of curvature of edge 48.

With shaft 34 continuously drivingly rotating, locking plate 46 and drive pin 52 are continuously driven clockwise as seen in FIGURES 4 and 6. The distance between shaft 40 and pin 52 and between shaft 40 and shaft 24 and the proportions of Geneva gear 54 are so regulated that pin 52 enters successively into each slot 56 to drive Geneva gear 54 intermittently counterclockwise in a conventional manner. As will be clear from FIGURES 4 and 6, pin 52 is in engagement in a given slot 56 over just a little more than 90° of arc of the circular path of pin 52 and is thereafter entirely disengaged from Geneva wheel 54 until it turns through a little less than 270° of arc for entry into the next succeeding slot 56. Therefore, Geneva gear 54 and with it shaft 24 and turret 12 will have a rest period about three times as long as a preceding or succeeding period of rotary motion. The purpose of recess 50 is merely to prevent interference between locking plate 46 and the radially projecting portions of Geneva gear 54 which define between them slots 56, during the periods of movement of the latter.

The principal function of locking plate 46 is to hold Geneva gear 54 firmly in exactly the position it occupies at the instant pin 52 leaves a slot 56 so as to prevent shifting of turret 12 during rest periods and to maintain the next succeeding slot 56 in the correct position for the reception of pin 52 at the beginning of the next period of rotary motion. Thus, as best seen in FIGURES 4 and 6, as pin 52 is leaving a recess 56, a substantial portion of peripheral edge 48 of locking plate 46 has begun to slide into a recess 58 on Geneva gear 54. The edge 48 and recesses 58 being complementary and in sliding contact, Geneva gear 54 cannot rotate so long as they remain in contact. It will also be apparent that when pin 52 enters the next succeeding slot 56, edge 48 will have almost completely slid free of locking contact with recess 58. Thanks to recess 50, Geneva gear 54 is free to turn without interference from locking plate 46 so long as the turning movement is controlled by the presence of pin 52 in a slot 56.

In this manner, turret 12 is rotated through equal arcuate distances, the periods of rotation alternating with periods of rest during which the turret is locked against misaligning movement. Four cycles of movement for a complete rotation are disclosed, but it will be obvious that eight cycles could be provided so as to make use of each of molds 14 instead of every other mold 14. Alternatively, turret 12 can from time to time be shifted one-eighth turn relative to shaft 24 so as completely to change the set of molds 14 with regard to which the work operations are performed, thereby to double the length of time molding device 10 may remain in operation without shutdown for replacement or repair of molds 14.

Mold lubrication

Each mold 14 comprises an annular cage 60 set into turret 12 adjacent the periphery thereof and having a spindle 62 slidably centrally disposed therein for ejecting movement relative to cage 60, as is more fully described in the above identified application. Between them, cage 60 and spindle 62 in the molding position shown in FIGURE 7 define an upwardly open mold cavity 64 having a bottom wall 66 and a continuous inner side wall 68 and a continuous outer side wall 70 spaced from and encompassing inner side wall 68. In the illustrated embodiment, cavity 64 is annular and has a vertical axis.

Broadly, lubrication of the molds is effected by directing a stream of fluent lubricant in the form of a diverging spray 72 against a portion of the mold surfaces defining a mold cavity during each rest period of turret 12, and moving the spray in contact with a portion of those surfaces about at least a major portion of a closed path during each rest period, the closed path being substantially congruent with the mold cavity. In the case of an annular mold cavity, the closed path is substantially circular and preferably the axis of the spray is maintained parallel to the axis and intersecting the mean circumference of the annular mold cavity during movement. It is not necessary that the spray move completely about the closed path, as the divergence of the spray will close any small gap that may remain between the beginning and the end of the path of the spray. Similarly, the beginning and the end of the path of the spray may overlap each other.

In order to produce spray 72, a spray head 74 is provided which has a single small spray orifice and which is fed by lubricant supply lines 76 from a lubricant tank 78. Any of a variety of fluent lubricants may be used and the choice of a lubricant will be somewhat conditioned by the nature of the material to be molded and the molding temperature and pressure. For the molding powder described in the above identified application, a light mineral oil is quite suitable, as are also other oils and mixtures of oil and lanolin. In general, the lubricant should not contain substantial quantities of sulfur or metallic elements or other harmful or incompatible ingredients and should not break down under high temperature and pressure. In the illustrated embodiment, the lubricant is at room temperature.

Lubricant is ejected under pressure in the form of a spray from spray head 74 by compressed air supplied through a compressed air line 80 fed by a conventional air compressor 82. In the illustrated embodiment, the pressure in spray head 74 is 40 p.s.i. gauge. Spray heads operated by compressed air are conventional in other arts, and hence the particular structure of spray heads 74 will not be further described as it forms no part of the present invention.

Spray head 74 is supported for movement with its axis at all times vertical by a horizontal supporting arm 84 which is longitudinally slidable in a slide block 86, the slide block 86 in turn being transversely slidable at right angles to the length of arm 84 in a guide standard 88 fixedly mounted on the supporting base 90 of the lubricating device. A pair of coil tension springs 92 are secured at one end to slide block 86 and at the other end to lugs 94 on either side of supporting arm 84 and continuously urge arm 84 to the right as seen in FIGURE 9 relative to slide block 86. A coil compression spring 96 acts between slide block 86 and the vertical arm of a bracket 98 secured to base 90 continuously to urge slide block 86 upwardly as seen in FIGURE 9 relative to guide standard 88. Thus, supporting arm 84 is movable in any direction in a horizontal plane and therefore spray head 74 may move in any horizontal path within the limits imposed by its supporting structure.

In order to impose on spray head 74 and hence spray 72 the movement in a closed bath appropriate to the size and shape of the mold cavity as discussed above, and in the illustrated embodiment to impose on spray head 74 a circular movement, a pair of generally elliptical cams 100 and 102 are adapted to contact the side of slide block 86 opposite spring 96 and the end of supporting arm 84 opposite spray head 74, respectively. The cams are mounted for rotation about vertical axes on vertical shafts 104 and 106, respectively, which are journalled for rotation on supporting base 90. Shafts 104 and 106 carry at their lower ends driven gears 108 and 110, respectively, which are identical to each other and are both in mesh with drive gear 112 which in turn is driven through appropriate reduction gearing by motor 114.

When gear 112 is driven in a counterclockwise direction as seen in FIGURE 9, cams 100 and 102 will be rotated clockwise from their full line position shown in FIGURE 9, in which they are out-of-phase with each other by 90°. Cam 100 will cause slide block 86 and associated supporting arm 84 to move downward as seen in FIGURE 9, and cam 102 will cause supporting arm 84 to move to the left as seen in FIGURE 9 relative to slide block 86. The shape of the cams assures that the movement of supporting arm 84 as expressed by spray head 74 will be circular. In this way, spray 72 traverses at least a major portion of a closed path congruent with the mold cavity and with the axis of spray 72 parallel to the axis and intersecting the mean circumference of cavity 64.

Naturally, the shape of cams 100 and 102 may be selected so as to imposed on spray head 74 a path of any desired size and shape within the limits of the spray head supporting structure.

Lubrication control

The movement of turret 12 controls the operation of lubricating device 16. Four cams 116 are spaced equidistantly about the periphery of turret 12 and are so positioned that each time turret 12 comes to rest a cam 116 will contact a microswitch 118 which in turn actuates a time control relay 120. Time control relay 120 is effective for a period of time not greater than the length of a rest period to complete a circuit between branch lines 122 and 124 leading from the trunk lines 126 and 128 by which motor 114 is continuously operated when switch 130 is closed. Switch 130 remains closed during entire operation of the molding machine, so that in the embodiment of FIGURE 2, the spray head revolves continuously.

From relay 120, branch lines 132 and 134 extend to operate a solenoid 136 which serves to open valve 138 in compressed air line 80 thereby permitting the flow of pressure air when current is flowing in lines 132 and 134 and preventing the flow of pressure air at other times. In this way, the spray is started when a cam 116 contacts microswitch 118 and is stopped when 116 and 118 move out of contact. Thus, means are provided for initiating the spray and discontinuing the spray respectively before and after each movement thereof about at least a major portion of the closed path of the spray so that the flow of the spray is discontinuous during at least a major portion of each period of rotary motion of the turret. It is not necessary that the spray be discontinued and initiated precisely at the beginning and end of each period of rotary motion of the turret. It is only necessary that at least a major portion of the movement of the spray about the closed path occur between the beginning and end of the flow of the spray. Preferably, the spray flows for a period of time equal to only a fraction of the length of a rest period. With a suitable fine spray, accurate control of the period of time the spray flows gives the desired accurate control of the extent of the oiling action. The amount of oil, although empirically arrived at, is critical for successful molding in respect to each powder being used.

A highly desirable mode of operation consists in providing a very fine spray and then moving this very fine spray about its closed path a plurality of times during each rest period. In this way, extremely accurate control of the quantity and uniformity of application of the lubricant is obtained.

A modified control arrangement is shown in FIGURE 3. In this embodiment, motor 114 is discontinuously driven, under control of relay 120', through branch lines 140 and 142. Further branch lines 144 and 146 extend to solenoid 136, so that spray head 74 moves and sprays only when a mold is stopped below it.

Operation

In operation, fluid motor 28 is actuated and drives turret 12 with an intermittent rotary motion by means of the intermittent rotary drive housed in casing 26. At the end of each period of rotary motion, a cam 116 comes to rest against microswitch 118 thereby actuating solenoid 136 to open valve 138 for a period of time predetermined by relay 120. Thus, although switch 130 is closed and the spray head is continuously moving, spray is being discharged therefrom only during separate periods one of which begins each time the turret stops. The operation of the embodiment of FIGURE 3 is the same except that the spray and the spray head are intermittently simultaneously started and stopped. In either embodiment, the lubricated mold then moves into the filling station where it is filled during the next rest period, then into the pressing station where molding takes place during the third rest period, and finally into the ejecting station where it is removed during the fourth rest period. The filling, pressing and ejecting mechanisms are intercontrolled with the turret in conventional fashion.

The operation of the molding device described above is fully automatic and very rapid and enables for the first time the use in high speed molding equipment of lubricated molds having mold cavities of a configuration such as described above.

From all of the foregoing, it will be obvious that each of the initially recited objects of the present invention has been achieved.

Although the present invention has been described in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for lubricating interior surfaces of a mold having an upwardly open annular mold cavity, comprising means for establishing a stream of lubricant, means for converting the stream into a spray, means for directing the spray against a portion of the mold surfaces defining the annular mold cavity, and means for moving the spray in contact with a portion of said surfaces about at least a major portion of a closed circular path with the axis of the spray parallel to the axis and intersecting the mean circumference of the annular mold cavity and with the path of the point of efflux of the spray disposed in a plane which is above the mold and perpendicular to the axis of the mold cavity.

2. A molding device comprising in combination a plurality of interconnected identical molds each having an upwardly open annular mold cavity, the distance between all immediately adjacent mold cavities being constant, means for moving the interconnected molds through a cycle of movement consisting of alternate periods of rest and periods of movement through a distance evenly divisible by said constant distance and in a direction such that each mold cavity occupies during each rest period a position occupied by another mold cavity during a previous rest period, means for establishing a stream of lubricant, means for converting the stream into a spray, means for directing the spray against a portion of the mold surfaces defining an annular mold cavity during each said rest period, and means for moving the spray in contact with a portion of said surfaces about at least a major portion of a closed circular path during each said rest period with the axis of the spray parallel to the axis and intersecting the mean circumference of a said annular mold cavity throughout each said rest period and with the path of the point of efflux of the spray disposed in a plane which is above the mold and perpendicular to the axis of the mold cavity.

3. A rotary molding device comprising in combination a rotatable mold turret having a plurality of identical upwardly open annular mold cavities spaced thereabout at a common distance from the axis of rotation of the turret, the arcuate distance between all immediately adjacent mold cavities being contsant, means for moving the turret through a cycle of movement consisting of alternate periods of rest and periods of rotary motion about said axis through an arcuate distance evenly divisible by said constant arcuate distance, means for establishing a stream of lubricant, means for converting the stream into a spray, means for directing the spray against a portion of the mold surfaces defining an annular mold cavity during each said rest period, and means for moving the spray in contact with a portion of said surfaces about at least a major portion of a closed circular path during each said rest period with the axis of the spray parallel to the axis and intersecting the mean circumference of the annular mold cavity and with the path of the point of efflux of the spray disposed in a plane which is above the mold and perpendicular to the axis of the mold cavity.

4. A rotary molding device comprising in combination a rotatable mold turret having a plurality of identical upwardly open annular mold cavities spaced thereabout at a common distance from the axis of rotation of the turret, the arcuate distance between all immediately adjacent mold cavities being constant, means for moving the turret through a cycle of movement consisting of alternate periods of rest and periods of rotary motion about said axis through an arcuate distance evenly divisible by said constant arcuate distance, means for establishing a stream of lubricant, means for converting the stream into a spray, means for directing the spray against a portion of the mold surfaces defining an annular mold cavity during each said rest period, means for moving the spray in contact with a portion of said surfaces about at least a major portion of a closed circular path during each said rest period with the axis of the spray parallel to the axis and intersecting the mean circumference of the annular mold cavity and with the path of the point of efflux of the spray disposed in a plane which is above the mold and perpendicular to the axis of the mold cavity, and means for initiating the flow of said spray and discontinuing the flow of said spray respectively before and after each said movement thereof about at least a major portion of said closed path so that the flow of said spray is discontinuous during at least a major portion of each said period of rotary motion of the turret.

References Cited in the file of this patent
UNITED STATES PATENTS

| | | |
|---|---|---|
| 1,924,018 | Begley et al. | Aug. 22, 1933 |
| 1,982,763 | Russell et al. | Dec. 4, 1934 |
| 2,189,783 | Eberhart | Feb. 13, 1940 |
| 2,341,477 | Pearson | Feb. 8, 1944 |
| 2,343,842 | Hatcher | Mar. 7, 1944 |